United States Patent

Hoeschele

[15] 3,635,851

[45] Jan. 18, 1972

[54] POLYURETHANE ELASTOMERS AND FOAMS PREPARED FROM POLYAMINE CURING AGENTS

[72] Inventor: Guenther Kurt Hoeschele, Wilmington, Del.

[73] Assignee: E. I. du Pont de Nemours and Company, Wilmington, Del.

[22] Filed: Nov. 20, 1969

[21] Appl. No.: 878,560

Related U.S. Application Data

[63] Continuation-in-part of Ser. No. 781,276, Dec. 4, 1968, abandoned, Continuation-in-part of Ser. No. 668,961, Sept. 19, 1967, abandoned, Continuation-in-part of Ser. No. 631,868, Apr. 19, 1967, abandoned, Continuation-in-part of Ser. No. 552,704, May 25, 1966, abandoned.

[52] U.S. Cl..............260/2.5 AM, 260/75 NH, 260/77.5 AM, 260/570 D
[51] Int. Cl. ...............................C08g 22/00, C08g 22/04
[58] Field of Search...............260/2.5 AM, 77.5 AM, 75 NH, 260/75 T

[56] References Cited

UNITED STATES PATENTS

| | | | |
|---|---|---|---|
| 2,683,730 | 7/1954 | Seeger et al. | 260/453 |
| 3,188,302 | 6/1965 | Lorenz | 260/77.5 |
| 3,412,071 | 11/1968 | Sundholm | 260/75 |

OTHER PUBLICATIONS

Rubber Age, Vol. 89, No. 2, May, 1961, pp. 263–268

Primary Examiner—Donald E. Czaja
Assistant Examiner—M. J. Welsh
Attorney—Vernon R. Rice

[57] ABSTRACT

Amine curing agents for polyurethane foams and elastomers obtained by condensing a monoamine composition with formaldehyde in the presence of a mineral acid. The monoamine can be 2-chloroaniline or mixtures of 2-chloroaniline with aniline and/or o-toluidine. The proportions of reactants are selected to produce curing agents which have moderate reactivities and exhibit a limited tendency to crystallize under normal operating conditions. The amine compositions are particularly useful as curing agents in the preparation of polyurethane foams. The new compounds, 3-chloro-4,4'-diaminodiphenylmethane and 3-chloro-3'-methyl-4,4'-diaminodiphenylmethane can be obtained from appropriate reaction products.

19 Claims, No Drawings

3,635,851

POLYURETHANE ELASTOMERS AND FOAMS PREPARED FROM POLYAMINE CURING AGENTS

RELATED APPLICATIONS

This application is a continuation-in-part of copending applications, Ser. No. 781,276 filed Dec. 4, 1968 and Ser. No. 668,961 filed Sept. 19, 1967 and now abandoned. Application Ser. No. 668,961 is a continuation-in-part of application, Ser. No. 631,868 filed Apr. 19, 1967 (now abandoned), which is a continuation-in-part of application, Ser. No. 552,704 filed May 25, 1966 (now abandoned).

BACKGROUND OF THE INVENTION

Polyurethane compositions obtained by curing liquid isocyanato-terminated prepolymers with diamines are finding increased use in diverse applications requiring castable elastomers. Because of their abrasion resistance, they are frequently used as coatings on surfaces subject to mechanical wear. Spray application of an undiluted mixture of prepolymer and amine curing agent is a particularly convenient means of preparing such coatings. However, the use of these polyurethanes in spraying as well as other applications has been somewhat restricted due to difficulties encountered in the curing processes with the diamine curing agents currently available. The main difficulty resulting from the use of these and other diamines with the prepolymers currently available is that solvents are usually required. Solvents are undesirable for reasons such as toxicity, flammability and cost. In addition, in spraying applications, the thin films obtained from a single coat of diluted material are seldom adequate for protecting against wear.

The most commonly used amine curing agents are hindered or negatively substituted aromatic diamines of which 3,3'-dichlorobenzidine and 4,4'-methylenebis(2-chloroaniline) (MOCA) are representative. To a lesser extent unhindered aromatic diamines such as 4,4'-methylenedianiline (MDA) and the phenylenediamines are used. The main advantage of the hindered diamine curing agents is their long pot life which in some cases facilitates molding operations. In spray applications, long pot life is undesirable because the freshly mixed and sprayed material often sags or drips before setting up. On the other hand, the unhindered aromatic diamines are so reactive that molding of polyurethanes prepared with their use, whether foamed or otherwise, is almost impossible and in spraying applications, gelling of the polyurethane occurs before the sprayed material has a chance to form an even coating. Furthermore, the highly reactive unhindered amines cause frequent plugging of spray equipment employing internal mixing. Generally, the relatively high melting points and rapid rates of crystallization of both hindered and unhindered diamines make them difficult to mix with the liquid isocyanato-terminated prepolymers and awkward to handle in the absence of a solvent. This is particularly true when the curing agents are used in the field. There has been a need in the art, therefore, for amine curing agents having moderate reactivities and exhibiting a limited tendency to crystallize under normal operating conditions.

Furthermore, prior art polyamine curing agents have been deficient for use in preparing polyurethane foams by reaction of an isocyanate and polyol (or an isocyanato-terminated prepolymer) with said curing agents in the presence of an expanding agent. Unhindered diamines such as MDA promote such rapid reaction that the foam formulation solidifies before full expansion is achieved. Hindered diamines such as MOCA have long pot lives, but once reaction occurs the foam formulation gels so rapidly that only incomplete expansion occurs. Moreover, the properties of foams prepared from prior art curing agents, particularly their compression set, have been disappointing in many cases.

SUMMARY OF THE INVENTION

It has been discovered that mixtures consisting essentially of aromatic di- and polyamines obtained by condensing a monoamine composition with formaldehyde in the presence of a mineral acid are excellent curing agents for polyurethane foams and elastomers. The monoamine used consists essentially of 2-chloroaniline or mixtures of amines containing at least 20 mole percent of 2-chloroaniline, 0–80 mole percent aniline and 0–80 mole percent o-toluidine. The total monoamine to formaldehyde mole ratio employed is about 1.3–1.9 with the proviso that when about 90–100 mole percent of the amine is 2-chloroaniline, the ratio of total moles of amine to formaldehyde does not exceed 1.8:1. In some instances the unreacted monoamines are removed by distillation of the reaction product as will be discussed hereinafter.

The new compositions of the present invention have reactivities which bridge the gap in reactivities characterizing the amine curing agents currently available. In the case where the monoamine composition consists essentially of 2-chloroaniline, the resulting curing agent has a reactivity similar to MOCA. Moreover, the new compositions exhibit such a limited tendency to crystallize that they can be normally handled as liquids which greatly facilitates mixing with liquid polyisocyanates. Because of these characteristics, castable polyurethanes employing the new curing agents can be readily applied in undiluted form by spraying. It should be noted, however, that the new compositions can often be used to advantage in forming castable polyurethanes by other procedures. The curing agents of this invention provide cured products having excellent properties, in some cases superior to those obtained by curing with prior art agents. The curing agents of this invention are also useful for preparing microcellular and foamed polyurethanes which result when a suitable amine curing agent and an isocyanato-terminated prepolymer or polyisocyanate and polyol in the case of "one-shot" systems are mixed in the presence of an expanding agent such as methylene chloride or tri-chlorofluoromethane.

DETAILED DESCRIPTION

The compositions of the present invention are obtained by condensing formaldehyde with a monoamine composition hereinafter described in detail. By employing certain proportions of the amine compositions and formaldehyde, condensation products are obtained which exhibit little tendency to crystallize and have suitable viscosities and reactivities for use as curing agents for urethane prepolymers. The compositions of the present invention are believed to be mixtures containing one or more diamines, related triamines and higher polyamines in varying proportions. The diamines which can be present are 4,4'-methylenedianiline, 4,4'-methylenebis(2-chloroaniline), 3-chloro-4,4'-diaminodiphenylmethane, 4,4'-methylenebis(2-methylaniline), 3-chloro-3'-methyl-4,4'-diaminodiphenylmethane and 3-methyl-4,4'-diaminodiphenyl-methane. The triamines which can be present are believed to have the following structure in which R, R' and R'' can each independently be hydrogen, chlorine or methyl:

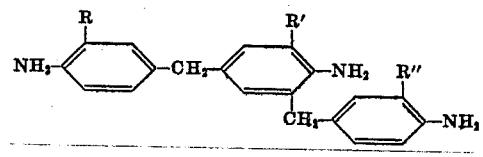

The higher polyamines are believed to have structures similar to that proposed for the triamines.

Preparation of the mixtures of this invention can be accomplished by any of the following procedures. In the preferred procedure, aqueous formaldehyde is added to the monoamine composition used in the presence of a mineral acid such as hydrochloric or sulfuric acid. The formaldehyde addition generally is performed at temperatures below about 50° C., but can be run at temperatures approaching 100° C. Following the formaldehyde addition, the reaction mass is heated for about 1 hour to several hours at temperatures from about 60°

C. to 100° C. The acid reaction mass is neutralized and the organic material is separated. At this point, any unreacted monoamines can be removed by steam or vacuum distillation; however, as will be pointed out hereinafter, removal of unreacted monoamines is not required for certain preferred mixtures included by the present invention. After drying, and filtering if any solids are present, the resulting mixture of di- and polyamines is the desired product. Alternatively, formaldehyde can be added to one of the monoamines or to a portion of 2-chloroaniline (if it is the only monoamine used) in the presence of mineral acid at temperatures below about 50° C., with the other monoamines (or remaining portion of 2-chloroaniline) being added after formaldehyde addition. In this stepwise procedure, heating at 60° to 100° C. as before is required after all of the monoamine has been added. Isolation of the product is accomplished as described for the mixed condensation. Detailed procedures for performing the mixed and stepwise condensation are provided by the examples.

Regardless of the procedure used the quantity of acid required is not critical and can be routinely determined by one skilled in the art. A generally practical amount is from about 0.5 to 2.0 moles of acid per mole of amine. Particularly good reaction rates and high conversions of monoamines are obtained when 0.9 to 1.2 moles of acid are employed per mole of amine. Representative mineral acids which can be used are hydrochloric acid, sulfuric acid and phosphoric acid. The strong mineral acids such as hydrochloric acid and sulfuric acid are preferred.

In carrying out the present invention it is important to control the mole ratio of each of the monoamines, aniline, 2-chloroaniline and o-toluidine, which can be present in the amine composition used. To obtain curing agents having the advantages described herein the monoamine compositions used are those containing about 20–100 percent 2-chloroaniline, 0–80 mole percent aniline and 0–80 mole percent o-toluidine, or stated another way, for each mole of 2-chloroaniline present the monoamine compositions contain from about 0.0–4.0 moles of aniline and/or o-toluidine. As the amount of 2-chloroaniline used in the amine composition increases, the product becomes higher melting and crystallizes more rapidly. When a lesser amount of aniline and/or o-toluidine than 10 mole percent is used and the ratio of total moles of monoamine to formaldehyde in in the range of about 1.8 to 2.0, the product contains large amounts of 4,4'-methylenebis(2-chloroaniline) with the result that it is higher melting, crystallizes more rapidly and differs only slightly in reactivity from pure 4,4'-methylenebis( 2-chloroaniline). To compensate for this effect, the ratio of total moles of amine to formaldehyde is adjusted downward to not exceed about 1.8 when less than 10 mole percent of the amine composition is aniline and/or o-toluidine. As the mole ratio of aniline and/or o-toluidine to 2-chloroaniline is increased within the limits specified, the reactivity of the mixtures of amine curing agents produced increases. At the same time, the concentration of tri- and polyamines is increased. This results in an increase in viscosity of the condensation products. Condensation products made with increasing ratios of aniline and/or o-toluidine to 2-chloroaniline have less tendency to crystallize and exhibit a lower rate of crystallization, these tendencies becoming more pronounced as the proportion of aniline increases. If less than 20 mole percent 2-chloroaniline is used in the amine composition, products differing only slightly in reactivity from pure 4,4'-methylenedianiline, 3-methyl-4,4'-diaminodiphenylmethane or 4,4'-methylenebis(2-methylaniline) are obtained, depending on the relative proportions of aniline and o-toluidine present.

It is frequently of commercial advantage in those embodiments of the invention in which aniline is employed as a reactant to use crude 2-chloroaniline which is the product obtained directly by the standard iron or hydrogen reduction of 2-chloronitrobenzene without fractional distillation of the product. A representative process of this type is given in U.S. Pat. No. 3,073,865 to Spiegler. The crude 2-chloroanilines of this type can contain as much as 15 percent or more aniline and about 2 percent or less of nonvolatile tarry materials which are formed during the reduction process. The amount of aniline in the crude 2-chloroaniline is taken into account in proportionally reducing the quantity of aniline (if any) to be added from another source.

Condensation products prepared from about equimolar mixtures of aniline and 2-chloroaniline at mole ratios of total monoamine to formaldehyde approaching 2:1 contain significant quantities of 3-chloro-4,4' -diaminodiphenylmethane. Those prepared from about equimolar mixtures of 2-chloroaniline and o-toluidine at mole ratios of total amine to formaldehyde approaching 2:1 contain significant quantities of 3-chloro-3'-methyl-4,4'-diaminodiphenylmethane. A diamine fraction enriched in 3-chloro-4,4'-diaminodiphenylmethane is readily obtained as a crystalline material having a melting point of 77°–79° C. by vacuum distillation of the proper condensation product. Substantially pure 3-chloro-4,4'-diaminodiphenylmethane can be obtained from this enriched fraction by routine fractional extractions with a weak acid such as dilute aqueous acetic acid. The melting point can be raised to 82°–83° C. by recrystallization. A diamine fraction enriched in 3-chloro-3'-methyl-4,4'-diaminodiphenylmethane having a melting range of about 84°–100° C. can be obtained by vacuum distillation. Both compounds are useful curing agents for urethane prepolymers but suffer from the usual disadvantage of conventional diamine curing agents in that they crystallize rapidly in contrast to the other curing agents of this invention.

The ratio of the total moles of monoamine to the moles of formaldehyde is maintained within the limits of about 1.3–1.9 to obtain mixtures which provide the advantages offered by the present invention, with the proviso that when the monoamine composition contains less than 10 mole percent of aniline and/or o-toluidine the total amine to formaldehyde ratio does not exceed 1.8. If the ratio falls below about 1.3 the condensation products contain very high concentrations of polyamines and are too viscous to be manufactured conveniently or for practical use. In fact for some applications such as in the preparation of castable polyurethanes, the ratio should be greater than about 1.6 and up to about 1.9. At higher mole ratios, diamines predominate in the condensation product and there are not sufficient tri- and polyamines present to prevent rapid crystallization.

The preferred mole ratio of aniline and/or o-toluidine to 2-chloroaniline is about 0.1–1.0 and the preferred mole ratio of total moles of monoamine to the moles of formaldehyde is about 1.65–1.85. Particularly preferred curing agents are prepared (1) when the monoamines are aniline and 2-chloroaniline, and/or (2) when the ratio of the total moles of monoamine to formaldehyde is about 1.65–1.8. The most preferred curing agents, in terms of convenience of use and the quality of their vulcanizates' properties, are those in which both conditions (1) and (2) are met. The composition of the reaction mixtures using the preferred ranges of reactants, after completion of the condensation and rearrangement, consists essentially of the desired di- and polyamine mixtures of this invention. These mixtures contain such small amounts of unreacted monoamines that steam or vacuum distillation is not usually required to produce useful products. The amounts of unreacted monoamines tolerable can routinely be determined by one skilled in the art by determining their effect on the physical properties of vulcanizates cured with the composition in question. Inasmuch as the removal of monoamines is complicated by the presence of large amounts of high boiling di-, tri- and polyamines, eliminating this step effects substantial savings in manufacture. At total moles of monoamine to formaldehyde ratios exceeding 1.65, it may be particularly desirable to use all three of the monoamines since the resulting products usually have a lower melting point than if only two or one of the monoamines is used.

The amine compositions in which the mole ratios are within the preferred range are generally more resistant to crystallization than are compositions prepared using higher ratios of total moles of monoamines to moles of formaldehyde. A further advantage of the preferred compositions is that their viscosities are generally greater than those prepared from higher mole ratios of monoamines to formaldehyde, which means that the viscosities of the preferred compositions match or approach the viscosities of many prepolymers with the result that mixing of curing agent and prepolymer is facilitated. Furthermore, the physical properties of vulcanizates, both foams and cast elastomers, improve as the monoamine/formaldehyde ratio decreases. Thus, polyurethanes cured with polyamines made using a monoamine to formaldehyde ratio of 1.80 or 1.85 have better compression set than those prepared when the monoamine/formaldehyde ratio is 1.9. In most systems, optimum properties are achieved at amine/formaldehyde ratios of about 1.65–1.8.

The curing agents of this invention are employed in substantially the same manner as are conventional diamine curing agents. They are particularly useful for curing isocyanato-terminated prepolymers based on either polyether or polyester glycols. For spray applications, prepolymers based on polyethers are generally preferred because of their low viscosity. The subject curing agents can also be used to prepare elastomers by "one-shot" procedures. It is emphasized that the present mixtures can be used at lower temperatures than conventional diamines because they are obtained as liquids which, if they crystallize, do so very slowly and if crystallization occurs, they can be remelted and again held as liquids for long periods, e.g., several days to several months.

Generally useful vulcanizates can be obtained by employing the mixtures of amines of this invention in amounts such that there are about 0.8 to 1.2 equivalents of amino groups per equivalent of isocyanato groups, however, the preferred ratio is about 0.90 to 1.1 equivalents of amino groups per equivalent of isocyanato groups. It has been found that for a given curative level, vulcanizates prepared with the curing agents of this invention are softer than those prepared with conventional diamines. Further, when the properties of vulcanizates prepared with the present curing agents are compared with the properties of diamine vulcanizates of about equal hardness, it is generally found that the present agents give vulcanizates having improved abrasion resistance and lower compression set. The hardness of vulcanizates can be increased readily by raising the free isocyanato group content of the prepolymer being used. It has also been found that when the present curing agents are used, heating is not required to obtain cross-linked vulcanizates. This is particularly advantageous in spray application where high abrasion resistance is often desired and heat curing may be impossible because large surface areas are involved.

The mixtures of amines of this invention are also useful ingredients for the preparation of polyurethane foams. They can be employed in prepolymer, semiprepolymer and one-shot foam processes in which they replace a portion of the active hydrogen usually supplied by water and/or a polyol. The techniques to be followed for preparation of foams by each of these processes are well known and can routinely be varied by one skilled in the art depending on the type of product desired. Representative foam compositions are those prepared from crude or refined polyisocyanates such as the tolylene diisocyanates, methylenebis(phenylisocyanates) and polyarylene polyisocyanates or mixtures thereof; polyols such as polyalkyleneether polyols and polyester polyols; and an expanding agent such as fluorotrichloromethane and carbon dioxide, the latter being generated upon the addition of water.

The process described in U.S. Pat. No. 2,850,464 illustrates the use of polyamines in general in the preparation of polyurethane foam in water-blown prepolymer systems. In an analogous manner, polyamines can be used in the preparation of foams by semiprepolymer and one-shot procedures by replacing part of the active hydrogen normally provided by the polyol with a polyamine. While the amine mixtures of this invention can be used to advantage for preparing flexible or rigid foams, they have been found to be particularly useful in the preparation of self-skinned, semirigid molded foam articles of moderate and high density. Such articles are useful as exterior and interior automotive trim parts. The overall density of these molded foams can be controlled by adjusting the quantity of expanding agent as is known for conventional polyurethane foams. The skin thickness can be increased by lowering mold temperature and/or increasing the heat capacity and thermal conductivity of the mold. Semirigid foam formulations including the amine mixtures of this invention build viscosity and develop gel strength quickly leading to efficient utilization of volatile expanding agents and permitting rapid demolding. However, gelling does not take place prematurely so as to prevent full expansion as is the case when prior art diamines such as 4,4'-methylenedianiline and 4,4'-methylenebis(2-chloroaniline). The foams have high loadbearing capacity and excellent flame resistance. The self-skinned molded articles prepared using the present amine mixtures accurately reproduce mold surfaces. The skin portions of such molded articles do not evidence any tendency to separate from the lower density interior portions. As previously noted, the compression set of foams cured with the amine mixtures of this invention is lower than that of foams cured with prior art polyamines.

In foam applications, amine curing agents prepared from molar ratios of total amine to formaldehyde from about 1.3 up to and including 1.9 can be used. When 2-chloroaniline is the only monoamine used, the ratio should not exceed 1.8. The preferred range for all monoamine compositions except those which consist essentially of 2-chloroaniline is about 1.6–1.85, with about 1.65–1.8 being particularly preferred. The monoamine compositions mentioned above which are employed in preparing the generally preferred curing agents are also used in preparing the preferred foam curing agents. The quantity of amine mixture used relative to the usual form ingredients can be varied widely. In prepolymer processes when all of the polyol has been reacted with diisocyanate or polyisocyanate prior to foam formation, the amine mixture can even be used as the sole reactant with the prepolymer during the foaming step if a volatile liquid is provided as the expanding agent. However, it is usually preferred to use a mixture of amine and polyol with about 15–85 percent of the total active hydrogen in the system being provided by the amine mixture. This is true for either semiprepolymer or one-shot systems. A particularly convenient procedure to follow when the semiprepolymer or one-shot processes are used is to dissolve the amine curing agent in the polyol component of the formulation prior to mixing with the polyisocyanate. This procedure is especially convenient when the more viscous amine curing agents are used. In some instances, particularly when the amine curing agent is very viscous, it may be advantageous to add the polyol to the curing agent reaction mixture subsequent to neutralization of the acid. This procedure frequently facilitates separation of the viscous amine curing agents from the neutralized reaction mass. The use of the mixtures of amines of this invention in foam preparation is illustrated hereinafter by examples utilizing semiprepolymer and one-shot techniques.

The invention will now be described with reference to the following examples of specific embodiments thereof wherein parts and percentages are by weight unless otherwise specified.

The following isocyanato-terminated prepolymers are used in the examples for evaluation of the curing agents of this invention.

*Prepolymer A* is made by reacting 1 mole of polytetramethyleneether glycol having a number average molecular weight of about 1,000 with 1.6 moles of 2,4-tolylene diisocyanate. It has a free —NCO content of about 4.1 percent and a Brookfield viscosity of about 6,200 c.p.s. at 50° C.

*Prepolymer B* is made by reacting 1 mole of polytetramethyleneether glycol having a number average molecular weight of about 1,000 with 2.0 moles of 2,4-tolylene diisocyanate. If has a free —NCO content of about 6.2 percent and a Brookfield viscosity of about 2,500 c.p.s. at 50° C.

The vulcanizates used for evaluating the curing agents prepared in the following examples are obtained by the following procedure. The amine curing agent and prepolymer are weighed prior to mixing and their temperatures are adjusted to the temperatures indicated in the examples. The prepolymer is placed in an agitated vessel and the liquid curing agent is added as rapidly as possible. Agitation is continued until the mix is uniform, at which time the mix is poured into preheated molds designed for forming test specimens. Curing of the cast material is accelerated by heating in an oven when open molds are used or in a press when closed molds are used. Curing times and temperatures are specified in the examples. The pot life which is reported in the examples represents the elapsed time from the start of mixing until the mixture becomes too viscous to be poured into molds.

The properties of the vulcanizates reported in the examples are measured substantially in accordance with the following ASTM procedures:

| | |
|---|---|
| Tensile Strength | D-412 |
| Elongation Break | D-412 |
| Set at Break | D-412 |
| Modulus | D-412 |
| Tear Strength | D-470 |
| Compression Set | D-395 |
| Resilience, Yerzley | D-945 |
| Resilience, Bashore | D-1054 |
| Abrasion Resistance | D-394 (Method B, NBS) |
| Hardness | D-676 |

A crosshead speed of 20 in./min. is used for the stress-strain measurements obtained by ASTM D-412.

EXAMPLE 1

The mixed condensation procedure for preparing a novel polyamine composition is illustrated as follows:

To a slurry consisting of 2-chloroaniline (254 parts), aniline (186 parts), 97 percent sulfuric acid (445 parts) and water (650 parts), 36.5 percent aqueous formaldehyde solution (172.5 parts) is added at once at 35°–40° C. agitation. These amounts correspond to a mole ratio of aniline to 2-chloroaniline of 1/1 and a mole ratio of total amine to formaldehyde of 1.9/1. The temperature is increased to 45° C. by the heat of reaction and is further increased by external heating to 85° C. within 30 minutes. After heating at 90° C. for 4 hours with stirring, the reaction mixture is made alkaline by adding sodium hydroxide in slight excess while maintaining the temperature at 90° C. The organic layer is separated from the aqueous phase and washed with an equal volume of hot water. The organic layer is freed of water and unreacted monoamine by distillation at reduced pressure. The last traces are removed by distilling at 150° C./0.5 mm. Hg.

Only 2.05 percent by weight of monoamines are recovered from the condensation product. When the same experiment is repeated except the monoamine/formaldehyde ratio is raised to 2/1, about 6.8 percent by weight of monoamine is recovered. The product of this example is a liquid having a Brookfield viscosity of 1,036 c.p.s. at 50° C. The average molecular weight is 289 and the assay for nitrogen is 11.8 percent, which values correspond to a calculated functionality of about 2.43. This material does not show any sign of crystallization after storage at room temperature for 3 months. Functionality is calculated by the formula given in example 2.

EXAMPLE 2

The procedure of example 1 is repeated, but the amount of formaldehyde (36.6 percent) is increased to 186 parts. These amounts correspond to a mole ratio of aniline to 2-chloroaniline of 1/1 and a mole ratio of total amines to formaldehyde of 1.76/1.

The recovery of unreacted monoamines from this condensation is nil. The resulting liquid has a Brookfield viscosity of 1,980 c.p.s. at 50° C., an average molecular weight of 296 and nitrogen assay of 11.8 percent. The calculated functionality is 2.49. The functionality is calculated by the following equation: functionality = (%N)M.W./1,400. This material does not show any sign of crystallization after storage at room temperature for 3 months.

The table below illustrates compounding data, curing conditions and vulcanizate properties for a vulcanizate (sample 1) prepared from Prepolymer B and the liquid product of this example.

| | Sample 1 |
|---|---|
| Prepolymer B, pts. | 100 |
| Polyamine, pts. | 18.6 |
| Curative Level, % | 103 |
| Mixing temperature, ° C. | 60 |
| Pot life, Min.* | 4 |
| Cure time at 100° C., hrs. | 1.5 |
| Tensile Strength, p.s.i. | 6900 |
| Elongation at Break, % | 300 |
| Modulus 100%, p.s.i. | 1100 |
| Tear Strength; D-470, pli. | 63 |
| Compression Set B, 70° C./22 hrs., % | 12 |
| NBS Abrasion Resistance, % | 234 |
| Hardness, Durometer A | 88 |

*The pot life for Prepolymer B when cured with the unhindered diamine, methylenedianiline, is estimated to be less than 0.1 min. at 85° C. This pot life is too short to permit normal processing. See *A. Technical Information Sheet*, J. G. D. Pinto, E. I. du Pont de Nemours & Co., Aug. 1, 1961.

When a vulcanizate is prepared from prepolymer A using 4,4'-methylenebis(2-chloroaniline) at a curative level of 95 percent of theory as curing agent, it has about the same hardness as sample 1 and manifests inferior compression set and NBS abrasion resistance when tested by the same procedures as indicated above.

EXAMPLE 3

The procedure of example 1 is repeated but the amounts of o-chloroaniline, aniline and formaldehyde are changed to 382.5 parts, 93 parts and 186.5 parts, respectively. These amounts correspond to a mole ratio of aniline to o-chloroaniline of one-third and a mole ratio of total amine to formaldehyde of 1.75/1.

The recovery of unreacted monoamines from this condensation is nil. The liquid product has a Brookfield viscosity of 2,168 c.p.s. at 50° C., an average molecular weight of 304, a nitrogen assay of 11.0 percent and a calculated functionality of 2.37. This material does not show any sign of crystallization at room temperature within 10 weeks.

The table below illustrates compounding data, curing conditions and vulcanizate properties for a vulcanizate prepared from Prepolymer B and the liquid product of this example.

| | |
|---|---|
| Prepolymer B, pts. | 100 |
| Polyamine, pts. | 19.6 |
| Curative level, % | 100 |
| Mixing Temperature, ° C. | 60 |
| Pot life, min. | 10 |
| Cure time at 100° C., hrs. | 3.0 |
| Tensile Strength, p.s.i. | 6125 |
| Elongation at Break, % | 260 |
| Modulus 100%, p.s.i. | 1100 |
| Tear Strength, D-470, pli. | 63 |
| Compression Set B, 70° C./22 hrs., % | 24 |
| NBS Abrasion Resistance, % | 237 |
| Hardness, Durometer A | 87 |

When a vulcanizate is prepared from Prepolymer A using 4,4'-methylenebis(2-chloroaniline) at a curative level of 95 percent of theory as curing agent, it has about the same hardness as the above product and manifests inferior compression set and NBS abrasion resistance when tested by the same procedures as indicated above.

EXAMPLE 4

The procedure of example 1 is repeated, but the amounts of o-chloroaniline, aniline, sulfuric acid, water and 37 percent aqueous formaldehyde are changed to 382.5 parts, 35 parts, 380 parts, 510 parts and 164.2 parts, respectively. These amounts correspond to a mole ratio of aniline to o-chloroaniline of one-eighth and a mole ratio of total amine to formaldehyde of 1.69/1.0.

No unreacted monoamines are recoverable from this condensation. The liquid product has a Brookfield viscosity of 3,060 c.p.s. at 50° C., an average molecular weight of 336, a nitrogen assay of 10.7 percent and a calculated functionality of 2.57. The polyamine remains liquid for 3 weeks at room temperature.

EXAMPLE 5

To a mixture of 127 g. of o-chloroaniline, 100 g. of 36.5 percent hydrochloric acid and 300 ml. of water, 80 g. of 37 percent aqueous formaldehyde is added at 25°–30° C. After stirring for 15 minutes, 93 g. of aniline and 97 g. of 36.5 percent hydrochloric acid is added which raises the temperature to 45° C. Within 30 minutes, the reaction mass is heated to 80° C. The temperature is maintained at 80° C. for 5 hours. The charge is neutralized by adding 83 g. of sodium hydroxide and the organic layer is separated and washed twice with hot water. Water and about 10 g. of unreacted monoamines are removed by vacuum distillation. The residue is a viscous liquid at room temperature which after standing for a month shows no sign of crystallizing. The product has the following analysis: C, 66.4%; H, 6.0%; N, 11.2% and Cl, 16.8%.

When a portion (180 g.) of the above polyamine is distilled at reduced pressure (0.15 mm. Hg.), the first fraction (collected at a head temperature of 167° C. and a pot temperature up to 210° C.), amounting to 85 g., is a diamine fraction enriched in 3-chloro-4,4'-diaminodiphenylmethane (Calc. for $C_{13}H_{13}ClN_2$ 232.7); C, 67.1; H, 5.63; Cl, 15.24; N, 12.05; Found C, 67.05; H, 5.65; Cl, 15.55; N, 12.05). The material has a melting point of 77°–79° C. Substantially pure 3-chloro-4,4'-diaminodiphenylmethane melting point 81°–83° C. can be obtained from the enriched fraction by routine fractional extractions with dilute aqueous acetic acid. A vulcanizate prepared by mixing 100 parts of Prepolymer A with 10.8 parts of the fraction enriched in 3-chloro-4,4'-diaminodiphenylmethane at 80° C. and curing for 3 hours at 100° C. has a tensile strength of 5600 p.s.i., an elongation at break of 600 percent, a tear strength of 114 pli and a hardness, Durometer A of 92.

EXAMPLE 6

A semirigid foam is prepared by a one-shot procedure in which two streams are brought together continuously in a high-speed mixing head. The ingredients employed and their proportions in parts by weight for the two streams are listed below:

Stream 1 (38°–43° C.)

| | |
|---|---|
| Polypropylene ether triol, number average molecular weight 4500, hydroxyl No. 38, prepared by reacting propylene oxide with glycerine and capping with ethylene oxide to give primary hydroxyl groups. The triol used is commercially available as "Voranol" CP–4601. | 100 parts |
| Polydimethylsiloxane 50 centistoke grade | 1 part |
| Triethylene diamine, 33% in dipropylene glycol | 1.5 parts |
| Dibutyl tin dilaurate | 0.02 part |
| Amine mixture prepared in example 3 | 20 parts |

Stream 2 (24° C.)

| | |
|---|---|
| Tolylene diisocyanate isomer mixture (65% 2,4-; 35% 2,6-) | 20.5 parts |
| Fluorotrichloromethane | 12 parts |

Equipment suitable for metering and mixing the streams is described in DuPont Elastomers Chemicals Bulletin Hr–32, "Metering and Mixing Equipment for the Production of Urethane Foam Products" by S. A. Steward, E. I. du Pont de Nemours and Company (Inc.), Wilmington, Del., Sept. 1958.

The mixture discharged from the high-speed mixer is directed into aluminum molds for forming 9"×2"×2.5" automotive arm rests. The molds are treated with a mold release agent and heated to 60°–74° C. prior to filling. About 3 minutes after the molds have been filled, the molded arm rests have developed sufficient strength to permit their removal from the molds. After standing over night at room temperatures the moldings are fully cured. The overall density of the finished moldings is 13 lbs./cu.ft.; the density of the cores 8.4 lbs./cu.ft. The foam has a tensile strength at break of 68 p.s.i. and an elongation at break of 170 percent. The surface of the molded arm rests is smooth and accurately reproduces the pattern of the molds.

EXAMPLE 7

This example describes the preparation of a semirigid foam by a semipropolymer procedure. A prepolymer is prepared by heating a mixture of 100 parts of the polypropylene ether triol described in example 6 and 81 parts of a mixture of tolylene diisocyanate isomers (80 percent 2,4-; 20 percent 2,6-) at 80° C. for 1 hour. The prepolymer is then cooled to room temperature. It has an —NCO content of about 20 percent.

Two streams having the compositions shown below are mixed as in example 6.

Stream 1 (24° C.)

| | |
|---|---|
| Prepolymer, 20% —NCO | 100 parts |
| Fluorotrichloromethane | 30 parts |

Stream 2 (52° C.)

| | |
|---|---|
| Polypropylene ether triol, described in example 6 | 179 parts |
| Amine mixture prepared in example 3 | 45.7 parts |
| Stannous octoate | 0.2 part |
| Triethylene diamine, 33% in dipropylene glycol | 2.5 parts |
| Polydimethylsiloxane, 50 centistoke grade | 1.0 part |

The mixture produced by continuously feeding the two streams to a high-speed mixer is discharged into lubricated aluminum molds previously heated to 60° C. The molded articles are stripped from the molds 2 minutes after filling. After standing overnight the foam articles are fully cured. The properties of the molded foam are equivalent to those of the foam prepared in example 6.

The short demolding times indicated in examples 6 and 7 reflect the rapid development of gel strength characteristic of foam compositions prepared by using the curing agents of this invention.

EXAMPLE 8

To a mixture of o-chloroaniline (510 parts), 97 percent sulfuric acid (450 parts) and water (850 parts), 37 percent aqueous formaldehyde (191 parts) is added with agitation at 35°–40 C. These amounts correspond to a mole ratio of o-chloroaniline to formaldehyde of 1.7/1.0. The temperature is raised to 85° C. within 30 minutes and maintained at 85°–95° C. for 4 hours. The reaction mixture is then poured into a solution of 360 parts of sodium hydroxide in 500 parts of water. The organic layer is separated from the aqueous layer and washed with an equal volume of hot water. The organic layer is freed of water by distillation at 150° C./0.5 mm. Hg. and then filtered. No o-chloroaniline is recovered during the distillation.

This product has an average molecular weight of 316. The assay for nitrogen is 10.15 percent and the calculated functionality is 2.32. When the molten product is cooled to 60° C. and agitated at 60° C., the first crystals appear after 85 minutes. This is in contrast to 4,4'-methylene-bis(2-chloroaniline) which deposits crystals before the temperature of the molten material reaches 60° C.

A vulcanizate prepared by mixing 6.34 parts of the curing agent of this example with 50 parts of Prepolymer A at 60° C. followed by curing for 3 hours at 100° C. has the following properties.

| | |
|---|---|
| Tensile Strength, p.s.i. | 5700 |
| Modulus, 300%, p.s.i. | 2200 |
| Permanent Set, % | 3 |
| Tear Strength, D–470 pli. | 35 |
| Hardness, Durometer A | 87 |
| Compression Set B, 70° C./22 hrs., % | 25 |
| Bashore Resilience, % | 40 |

EXAMPLE 9

The procedure of Example 8 is repeated except the amount of 37 percent aqueous formaldehyde is increased to 205 parts. This gives a 2-chloroaniline to formaldehyde ratio of 1.5. The product has a Brookfield viscosity of 4,350 c.p.s. at 50° C. and an average molecular weight of 333. The assay for nitrogen is 10.4 percent and the calculated functionality is 2.45. When the molten product is cooled to 60° C. and agitated at 60° C., several hours elapse before the first crystals appear. The curing agent of this example is particularly useful in the preparation of urethane foam by procedures such as those described in examples 6 and 7.

EXAMPLE 10

To a mixture of o-chloroaniline (510 parts), 97 percent sulfuric acid (445 parts) and water (650 parts), 36.6 percent aqueous formaldehyde (242 parts) is added with agitation at 40°–50 C. These amounts correspond to a mole ratio of o-chloroaniline to formaldehyde of 1.35/1.0. Within an hour, the temperature is raised to 85° C. and maintained at 85°–90° C. for 2 more hours. The reaction mixture is then poured into a solution of 360 parts of sodium hydroxide in 500 parts of water. The organic layer is separated, washed with an equal volume of hot water and dried by distillation at 120° C. and 1 mm. Hg. No unreacted monoamine is obtained during the distillation. Following distillation the product is filtered.

The product has an average molecular weight of 367. The assay for nitrogen is 10.2 percent and the calculated functionality is 2.67. The product has a Brookfield viscosity of 1270 c.p.s. at 75° C. The product does not show any sign of crystallization after standing at room temperature for several months.

A semirigid foam is prepared from this product by a batch one-shot procedure employing the following formulation:

Mixture 1

| | |
|---|---|
| Polypropylene ether triol of example 6 | 100 parts |
| Polydimethylsiloxane, 50 centistoke grade | 1 part |
| Triethylene diamine, 33% in dipropylene glycol | 1.5 parts |
| Dibutyl tin dilaurate | 0.1 part |
| Amine mixture of this example | 21.6 parts |

Mixture 2

| | |
|---|---|
| Tolylene diisocyanate isomer mixture (80% 2,4-; 20% 2,6-) | 20.4 parts |
| Fluorotrichloromethane | 10 parts |

Mixture 1 is heated to 43°–44° C. and Mixture 2 (at room temperature) is then added to Mixture 1 and the entire mass is vigorously agitated for about 6 seconds and then poured in a mold and allowed to foam. The density and stress-strain properties of the resulting foam are similar to those of the foams prepared in examples 6 and 7. The rates of foam rise and curing to a tackfree state are somewhat slower than those observed with the amine mixture used in examples 6 and 7. The finished foam is covered with a smooth, adherent skin similar to that observed for the foams prepared in examples 6 and 7.

EXAMPLE 11

To a mixture of 2-chloroaniline (382.5 parts), o-toluidine (107 parts), 97 percent sulfuric acid (445 parts) and water (650 parts), 36.6 percent aqueous formaldehyde (198 parts) is added with agitation at 40°–50° C. These amounts correspond to a mole ratio of o-toluidine to 2-chloroaniline of one-third and a mole ratio of total monoamine to formaldehyde of 1.65/1. The temperature is then raised to 85° C. within 1 hour and the reaction mass is maintained at 85°–90° C. for 2 hours. The reaction mass is neutralized by the addition of a solution of 360 parts of sodium hydroxide in 400 parts of water. The organic layer is separated and washed twice with 1,000 parts of water at 90° C. The organic layer is dried by heating to 120° C. at a pressure of 1 mm. Hg and filtered. No monoamine is recovered.

The product has a Brookfield viscosity of 5,700 c.p.s. at 50° C. and an average molecular weight of 325. The assay for amino group nitrogen is 10.6 percent and the calculated functionality is 2.46.

The product does not show any signs of crystallizing after standing at room temperature for 12 weeks. It is especially useful in the preparation of urethane foam by the procedures described in examples 6 and 7.

EXAMPLE 12

A medium density flexible foam is prepared by a batch procedure using the following formulation:

Solution 1

| | |
|---|---|
| Polyalkyleneether triol, hydroxyl number 37.1, prepared by condensing 1,2-propylene oxide with 1,1,1-trimethylolpropane and capping with ethylene oxide | 75.0 g. |
| Amine mixture of example 3 | 15.0 g. |
| Polydimethylsiloxane oil, 50 centistoke grade | 0.75 ml. |
| Triethylene diamine, 33% solution in dipropylene glycol | 1.13 ml. |

| | |
|---|---|
| Stannous octoate | 0.10 g. |

Solution 2

| | |
|---|---|
| Tolylene diisocyanate, 65% 2,4-isomer and 35% 2,6-isomer | 15.1 g. |
| Trichlorofluoromethane | 12.0 g. |

Solution 1 is prepared by dissolving the amine mixture in the triol and then adding the other ingredients. Solution 1 at about 25° C. is stirred in a 250 ml. beaker with a small high-speed mixer for 30 seconds and then Solution 2, also at about 25° C., is added rapidly and mixing continued for 3 seconds. The mixture is then poured immediately into a 1 quart container and allowed to foam. The foam rises to its full height in 41 seconds and after 70 seconds its surface is no longer tacky. The foam is resilient and has an overall density of 7.8 lbs./cu. ft.

When the above procedure is repeated with the exception that the amine mixture of example 3 (15.0 g.) is replaced with an equivalent amount of 4,4'-methylenedianiline (11.6 g.), solidification of the mixture of Solution 1 and Solution 2 occurs in the beaker in less than 3 seconds without foaming. This result demonstrates that the prior art unhindered diamine 4,4'-methylenedianiline is so reactive that it cannot be used successfully to prepare foams of the type described hereinbefore.

When the above procedure is again repeated with the exception that the amine mixture of example 6 (15.0 g.) is replaced with an equivalent amount of 4,4'-methylenebis(2-chloroaniline) (15.7 g.), the mixture of Solutions 1 and 2 does not start to foam until it has been poured into the container. The foam hardens suddenly before expansion can be completed and large bubbles of gas escape and some splitting occurs. The foam stops expanding in only 21 seconds measured from the start of mixing of Solutions 1 and 2. The resulting foam is hard and dense and has an overall density of 21 lbs./cu. ft. This run demonstrates the lower reactivity of a prior art hindered diamine and the tendency toward premature gelling before full expansion can take place, the latter effect resulting in inefficient utilization of the expanding agent, splitting and a dense, stiff product.

When the amine mixture of example 3 is replaced with an equimolar mixture of 4,4'-methylenedianiline (5.8 g.) and 4,4'-methylenebis(2-chloroaniline) (7.8 g.) the mixture of Solutions 1 and 2 solidifies in the beaker before it can be poured and only little foam formation occurs.

When the amine mixture of example 3 is replaced with 3-chloro-4,4'-diaminodiphenylmethane (13.6 g.) foaming starts before the mixture of Solutions 1 and 2 can be poured into the container. However, the foam rises smoothly to maximum height in 28 seconds and after 50 seconds its surface is no longer tacky. The foam is resilient and has an overall density of 8 lbs./cu.ft.

The curing agent of example 3 is much more conveniently handled and generally gives foams of better compression set than any of the diamine curing agents used in this example.

EXAMPLE 13

A. Four samples of polyamine curing agents 1, 2, 3 and 4, are prepared by the procedure described in example 1. Samples 1, 2 and 3 are within the scope of the present invention; Sample 4 is a prior art curing agent. Each of the samples is identically prepared except the amine/formaldehyde ratio used to prepare them is varied. Pertinent data regarding the preparation and properties of each of the resulting polyamine curing agents are given in the table below.

| Sample | 1 | 2 | 3 | 4 |
|---|---|---|---|---|
| OCA/$\phi$NH$_2$ Mole ratio | 3:1 | 3:1 | 3:1 | 3:1 |
| Amine/CH$_2$O Mole ratio | 1.90 | 1.85 | 1.80 | 2.0 |
| First sign of Crystallization (days) at 30° C. | 2 | 5 | 31 | Less than 1 |
| at 60° C. | 4 | 25 | No sign of crystallization after 41 days | 2 |

OCA = orthochloroaniline $\phi$NH$_2$ = aniline

As can be seen from the above data, the tendency of the polyamine curing agent to crystallize becomes markedly less as the amine/formaldehyde ratio is decreased.

B. The four polyamine curing agent samples described above are evaluated as curatives for Prepolymer B in making cast elastomers. In preparing the cast elastomers, spray application conditions are simulated. The degassed prepolymer and molten curing agent are mixed at 70° C., poured in a mole maintained at room temperature and allowed to cure at room temperature for 8 to 10 days. The polyamine curing agents are used at 100 percent curative level. The vulcanizate properties are shown in the table below.

TABLE

Room Temperature Cures Of Prepolymer B

| | | | | |
|---|---|---|---|---|
| Prepolymer B | 80 | 80 | 80 | 80 |
| Sample 1, pts. | 15.43 | — | — | — |
| Sample 2, pts. | — | 15.35 | — | — |
| Sample 3, pts. | — | — | 15.33 | — |
| Sample 4, pts. | — | — | — | 15.49 |
| Mixing temp., ° C. | 70 | 70 | 70 | 70 |

Tested After 7 Days at 75° F. (24° C.)

And 50% Relative Humidity

| | | | | |
|---|---|---|---|---|
| Tensile strength, p.s.i. | 5000 | 5000 | 5500 | 4800 |
| Elongation at break, % | 340 | 300 | 300 | 380 |
| Modulus 100%, p.s.i. | 600 | 700 | 700 | 500 |
| Modulus 300%, p.s.i. | 3200 | 5000 | 5500 | 2600 |
| Split Tear D-470, pli. | 56 | 61 | 67 | 60 |
| Comp. set, method B, %* | 69 | 35 | 24 | 98 |
| NBS abrasion resistance, % | 974 | 780 | 688 | 688 |

*22 hours/70° C.

As can be seen from the above data, the physical properties of the various vulcanizates are about the same except that the NBS abrasion resistance of the vulcanizates prepared from the samples of the present invention is generally improved and the compression set of these vulcanizates is dramatically improved over the vulcanizate prepared from the prior art curing agent.

Samples 1, 2, 3, and 4 are also evaluated as curatives in the preparation of polyurethane foams using the procedures and materials described below.

MATERIALS

*Pluracol TPE–4542* = a polyalkyleneether triol having primary hydroxyl groups and an equivalent weight of about 1,500. It is prepared by condensing 1,2-propylene oxide with 1,1,1-trimethylolpropane and capping with ethylene oxide. It is commercially available from Wyandotte Chemicals Corporation.

P–2000 = polypropyleneether glycol having an equivalent weight of 1000.

DC–195 = a polydimethylsiloxane polyalkyleneether block copolymer foam surfactant, viscosity, 325 centistokes at 25° C.; specific gravity, 1.07; refractive index, 1.4540 at 25° C. and hydroxyl content, 1.8 percent by weight. It is commercially available from Dow Corning Corporation.

Dabco 33LV = 33 percent by weight solution of triethylene diamine in dipropylene glycol.

"Hylene" TM–65 = a mixture of tolylene diisocyanate isomers, 65 percent 2,4- and 35 percent 2,6-.

The following formulation was used:

Solution 1

| | |
|---|---|
| Pluracol TPE–4542 | 200.0 g. |
| P–2000 | 200.0 g. |
| DC–195 | 4.0 g. |
| Dibutyltin dilaurate | 0.4 g. |
| Dabco 33LV | 6.0 g. |
| Polyamine curing agent | As shown in table |

Solution 1 was prepared by mixing all of the ingredients at room temperature except the amine curing agent. The amine, heated to 100° C., was then added and mixed uniformly throughout.

Solution 2

| | |
|---|---|
| "Hylene" TM–65 | 90.0 g. |
| Trichlorofluoromethane | 56.0 g. |

Solution 2 was prepared by adding the trichlorofluoromethane to the "Hylene" TM–65 and mixing.

FOAM PREPARATION

To prepare the foams, Solution 2 was added to Solution 1 and the combined solutions were mixed with a high speed laboratory mixer for 7–8 seconds, poured into a cardboard mold and allowed to foam. Two sets of samples were cut from the foam resulting from each run. One set of samples was allowed to cure at room temperature and the other set of samples was cured for 1 hour at 100° C. Before testing, all samples were allowed to stand at room temperature for a minimum of 24 hours.

Densities and compression sets were measured on 2×2×1 inch samples. Compression sets were run on duplicate samples compressed on the 1 dimension. Density and compression set were determined essentially by the methods of ASTM D1564.

The amounts of each of the amine curing agent used and physical properties of the corresponding foams are shown in the following table.

| | 1 | 2 | 3 | 4 |
|---|---|---|---|---|
| Amount of amine curing agent (grams) | 80.4 | 79.8 | 79.6 | 80.4 |
| Core Density lb./cu. ft. | 6.1 | 6.1 | 6.0 | 7.6 |
| Comp. set method B 50%, 22 hr. at 79° C. | | | | |
| Uncured | 43.0 | 37.0 | 18.5 | 74.0 |
| Cured, 1 hr. at 100° C. | 36.5 | 25.0 | 20.5 | 69.0 |

As shown by the foregoing data, the comparison set of the foams within the present invention is substantially superior to the compression set of the prior art foam. The improvement in compression set becomes more significant as the monoamine/formaldehyde ratio is decreased.

What is claimed is:

1. In a polyurethane prepared by reacting an organic polyisocyanate, a polyol and an amine curing agent, the improvement consisting essentially of the polyurethane produced when said amine curing agent is the condensation product of a monoamine composition with formaldehyde in the presence of a mineral acid; said monoamine composition consisting essentially of about 20–100 mole percent 2-chloroaniline, 0–80 mole percent aniline and 0–80 mole percent o-toluidine, and wherein the mole ratio of monoamine to formaldehyde is greater than about 1.6 and up to about 1.85, with the proviso that when the monoamine consists essentially of 2-chloroaniline said mole ratio does not exceed 1.8.

2. A composition of claim 1 wherein the polyurethane is a castable polyurethane elastomer prepared by reacting a liquid isocyanato-terminated prepolymer with the amine curing agent described in claim 1 in such proportions that there are from about 0.8–1.2 equivalents of amine groups per equivalent of isocyanato groups.

3. A castable polyurethane of claim 2 wherein the monoamine composition used in preparing the curing agent consists essentially of 0–50 mole percent aniline, 0–50 mole percent o-toluidine and 50–90 mole percent 2-chloroaniline.

4. A castable polyurethane of claim 3 wherein the ratio of the total moles of monoamine to the moles of formaldehyde used in preparing the curing agent is about 1.65–1.85.

5. A castable polyurethane of claim 3 wherein the ratio of the total moles of monoamine to the moles of formaldehyde used in preparing the curing agent is from about 1.65–1.8.

6. A castable polyurethane of claim 2 wherein the monoamine composition used in preparing the curing agent is a mixture of aniline and 2-chloroaniline in which the mole ratio of aniline to 2-chloroaniline is about 0.1–4.0.

7. A castable polyurethane of claim 6 wherein the mole ratio of aniline to 2-chloroaniline used in preparing the curing agent is from about 0.1–1.0 and the ratio of the total moles of aniline and 2-chloroaniline to the moles of formaldehyde is about 1.65–1.85.

8. A castable polyurethane of claim 7 wherein the ratio of the total moles of aniline and 2-chloroaniline to the moles of formaldehyde used in preparing the curing agent is about 1.65–1.8.

9. A castable polyurethane of claim 2 wherein the monoamine composition used in preparing the curing agent consists essentially of 2-chloroaniline.

10. In a polyurethane foam prepared by reacting a polyisocyanate, a polyol and an amine curing agent in the presence of a blowing agent, the improvement consisting essentially of the foam produced when said amine curing agent is the condensation product of a monoamine composition with formaldehyde in the presence of a mineral acid; said monoamine composition consisting essentially of about 20–100 mole percent 2-chloroaniline, 0–80 mole percent aniline and 0–80 mole percent o-toluidine, wherein the mole ratio of monoamine to formaldehyde is about 1.3–1.85, with the proviso that when the monoamine consists essentially of 2-chloroaniline said mole ratio does not exceed 1.8.

11. A polyurethane foam of claim 10 wherein the monoamine composition used in preparing the curing agent consists essentially of 0–50 mole percent aniline, 0–50 mole percent o-toluidine and 50–90 mole percent 2-chloroaniline.

12. A polyurethane foam of claim 11 wherein the ratio of the total moles of monoamine to the moles of formaldehyde used in preparing the curing agent is from about 1.65–1.85.

13. A polyurethane foam of claim 10 wherein the monoamine composition used in preparing the curing agent is a mixture of aniline and 2-chloroaniline in which the mole ratio of aniline to 2-chloroaniline is about 0.1–4.0 and the ratio of the total moles of monoamine to formaldehyde is about 1.3–1.85.

14. A polyurethane foam of claim 13 wherein the mole ratio of aniline to 2-chloroaniline used in preparing the curing agent is about 0.1–1.0.

15. A polyurethane foam of claim 14 wherein the ratio of total moles of monoamine to moles of formaldehyde is about 1.65–1.85.

16. A polyurethane foam of claim 15 wherein the ratio of the total moles of monoamine to moles of formaldehyde used in preparing the curing agent is about 1.65–1.8.

17. A polyurethane foam of claim 10 wherein the monoamine used to prepare the curing agent is substantially all 2-chloroaniline.

18. A polyurethane foam of claim 10 wherein the foam is prepared by the one-shot process in which the polyisocyanate, polyol and amine curing agent are reacted substantially simultaneously.

19. A polyurethane foam of claim 16 wherein the foam is prepared by the one-shot process in which the polyisocyanate, polyol and amine curing agent are reacted substantially simultaneously.

* * * * *